(12) United States Patent
Paradiso et al.

(10) Patent No.: US 7,864,051 B2
(45) Date of Patent: *Jan. 4, 2011

(54) QUASI-PASSIVE WAKEUP FUNCTION TO REDUCE POWER CONSUMPTION OF ELECTRONIC DEVICES

(75) Inventors: Joseph A. Paradiso, Medford, MA (US); Hongshen Ma, Cambridge, MA (US); Andrew Benjamin Lippman, Salem, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 790 days.

This patent is subject to a terminal disclaimer.

(21) Appl. No.: 11/522,612

(22) Filed: Sep. 18, 2006

(65) Prior Publication Data

US 2007/0013523 A1 Jan. 18, 2007

Related U.S. Application Data

(63) Continuation of application No. 10/255,557, filed on Sep. 26, 2002, now Pat. No. 7,109,865.

(51) Int. Cl.
 *G08B 13/14* (2006.01)
(52) U.S. Cl. .............. 340/572.1; 340/572.3; 340/572.4; 340/571; 340/539.1; 340/539.13; 340/825.69; 340/10.34

(58) Field of Classification Search .............. 340/572.1, 340/572.4, 571, 573.1, 539.1, 825.49, 825.69, 340/825.72, 825.33, 825.34, 572.3, 539.13, 340/10.33, 10.34
See application file for complete search history.

(56) References Cited

U.S. PATENT DOCUMENTS

| 5,387,993 | A  | * | 2/1995  | Heller et al. | 398/151 |
| 5,686,902 | A  | * | 11/1997 | Reis et al.   | 340/10.2 |
| 5,809,142 | A  | * | 9/1998  | Hurta et al.  | 705/68  |
| 6,297,737 | B1 | * | 10/2001 | Irvin         | 340/571 |
| 6,446,865 | B1 | * | 9/2002  | Holt et al.   | 235/382 |
| 6,721,289 | B1 | * | 4/2004  | O'Toole et al. | 370/311 |
| 2002/0138199 | A1 | * | 9/2002 | Brodie       | 701/213 |

* cited by examiner

*Primary Examiner*—Hung T. Nguyen
(74) *Attorney, Agent, or Firm*—Norma E. Henderson (57) ABSTRACT

A quasi-passive wake-up function for an electronic device that employs a continuous low power standby mode compares a received signal to a predetermined signal and wakes up the device when the received signal is the same as the predetermined signal. An electronic device having a quasi-passive wakeup function includes a receiver for receiving at least one stimulus signal, a comparator for comparing the received signal to a predetermined signal, and at least one logic gate for waking up the electronic device when the received stimulus signal is the predetermined signal. In one application, identification tags are used to distinguish a unique tagged item from among a plurality of items with a similar appearance. When an interrogation signal is not present, the tags sleep at a very low power level.

18 Claims, 4 Drawing Sheets

QUASI-PASSIVE WAKEUP FUNCTION TO REDUCE POWER CONSUMPTION OF ELECTRONIC DEVICES

RELATED APPLICATIONS

This application is a continuation of U.S. patent application Ser. No. 10/255,557, filed Sep. 26, 2002, now U.S. Pat. No. 7,109,865, issued Sep. 19, 2006, the entire disclosure of which is herein incorporated by reference.

FIELD OF THE TECHNOLOGY

The present invention relates to self-powered electronic devices that have a low power shutdown "standby" mode and, in particular, to minimization of the power consumption of such devices.

BACKGROUND

Identification systems are used to locate both animate and inanimate objects. For example, identification systems can locate vehicles carrying interstate freight, employees within a hospital, and items in retail establishments to guard against theft. Identification systems may also be used to locate sources of information. However, in some ways, the difficulty of locating unique information has increased with modern advances in information technology and related storage devices. Because many forms of modern information storage media have a nondescript appearance, there is an increased need to locate specific files and data from among many objects that have similar, or even identical, appearances. For example, a collection of compact discs (CDs) that contain stored data (e.g., digital photographs) may be searched in order to locate the specific CD that contains a particular digital photograph being sought. If the contents of each CD are clearly indicated on the CD or the CD storage case, the search will likely be successful, but it will also be tedious because each CD must be inspected until the photograph is found. If the CD contents are not identified, the search will become even more lengthy because each CD must be inserted into a computer where the contents of the CD may be read. Many other forms of information storage media present similar difficulties in locating specific stored information. As a result, the search for the media containing a specific document or file may become painstakingly tedious because the field of search is large.

The preceding example is directed to a single type of information storage medium, e.g., CDs. However, because more than one type of information storage medium may be suitable for storing a particular type of data, the search for a unique item from among multiple different types of items (e.g., digital audio tapes, floppy disks, DVDs, and miniDVDs) may be required. This multi-medium search presents many of the previously described challenges, particularly when the searcher is not sure which medium contains the unique item that is sought.

These challenges are not limited only to electronic storage media, and information storage media generally. For example, the collection of anonymous boxes and crates found in any warehouse are also difficult to distinguish from one another, and determination of their contents is generally difficult without a close individual investigation.

Many of today's identification systems employ "tags" that may be read by an external (and typically wireless) reader. Generally, identification tags fall into one of two categories: passive and active tags. Passive identification tags are powered by a tag sensing system. For example, the tag circuits of some passive tagging systems are powered via a magnetic, electrostatic or RF field broadcast by a tag reader. Active power tags are those tags that include a power supply. Active tags consume a considerable amount of power in order to receive the tag identification signal, in part because of the linear amplifiers typically required in the receivers of these tags. Because, generally, a battery supplies the power for active tags, these tags have relatively short operational lives before either the battery must be replaced or the tag discarded.

One method that may be employed to conserve the operational life of active tags or other self-powered electronic devices is to provide the device with a lower power "standby" or "sleep" mode. The inherent problem with such a solution is devising a way to "wake up" the device when it is needed. Existing devices require that the device periodically wake itself up in order to ascertain whether or not it has been called, a requirement that necessarily requires power every time the device wakes up. For example, in U.S. Pat. No. 5,387,993 (Heller et al), a tag is disclosed with a "sleep mode". The "sleep mode" of Heller is a shutdown period of a predetermined time, after which the tag reactivates itself to perform various tasks [Heller at col. 3, lines 48-57]. The sleep mode of Heller is therefore very power-costly, with the tag spending a fair amount of time awake and using power on a fixed, predetermined schedule, even when no transmissions are being sent out by the transmitter. What has been needed, therefore, is a wake-up function for electronic devices that keeps the device in a low-power standby mode until, and unless, an interrogation or other summoning signal is detected.

SUMMARY

The present invention is a quasi-passive wake-up function for electronic devices that have, or can be modified to employ, a low power standby mode. The function of the present invention permits the associated electronic device to be maintained in an extremely low-power shutdown mode until, and unless, a stimulus signal is detected. The function of the present invention is therefore extremely power-conserving, waking only when "called" by a transmitter, rather than reactivating at periodic intervals even when not needed. The present invention may be advantageously employed in self-powered devices and any other device where energy efficiency is desired.

In one aspect, the present invention is a method for waking up an electronic device, being maintained in a continuous low power shutdown mode, by comparing a received signal to a predetermined unique stimulus signal and waking up the device when the received signal is the same as the predetermined unique stimulus signal. In one embodiment, the present invention further comprises isolating at least one characteristic of the received signal from background signals, determining whether or not the characteristic of the received signal matches a same characteristic of the predetermined unique stimulus signal, and asserting a logic gate to wake up the electronic device when the received signal is the predetermined signal. In one embodiment, the received signal is filtered to isolate the carrier frequency of the received signal for comparison to the carrier frequency of the predetermined signal.

In one aspect, the present invention may be employed in a system that facilitates discrimination among similar items by causing the item itself, or a tag associated therewith, to produce—directly or indirectly—an observable signal. Thus, in response to a signal that encodes the identity of the desired item, that item will effectively announce itself in a manner that facilitates its ready location. In one embodiment, an improved approach to locating items is provided by identification tags that respond to an interrogation signal only when the signal containing that tag's unique identification is received. That response is an observable signal rather than one detectable only by the tag reader. Particular advantages are achieved when the tag is substantially passive, operating in a very low-power "sleep" mode according to the present invention until the signal uniquely associated with that tag is detected.

In a further aspect, an identification tag employing the present invention is associated with a specific object having a generic appearance. The tag includes a receiver for receiving an interrogation signal that includes an object identification, a memory for storing a tag identification that uniquely identifies the tag, and a device for emitting an observable signal in response to the interrogation signal when the object identification matches the tag identification. The tag of this embodiment includes a power source that supplies an operating current for the tag. In a version of any of these embodiments, the tag operates in a very low power sleep mode when not processing the interrogation signal. In a particular, a power source supplies an operating current of less than or equal to 500 nanoamps when the tag is in a sleep mode. In this case, the tag "wakes up" from its very low power sleep mode upon detecting the carrier frequency of the interrogation signal, then responds upon finding a particular modulated transmit code. In still another embodiment, the observable signal is audible. In a further embodiment, the observable signal is visible.

In another aspect, the present invention is quasi-passive wakeup device for waking up an electronic device being maintained in a continuous low power shutdown mode, comprising a comparator for comparing a received signal to a predetermined stimulus signal and at least one logic gate for waking up the electronic device when the received signal is the predetermined signal. In one embodiment, the device includes a filter for isolating at least one characteristic of the received signal and the comparator compares the isolated characteristic to a same characteristic of the predetermined signal. In another aspect, the present invention is an electronic device having a quasi-passive wakeup function. In one embodiment, the electronic device includes a receiver for receiving at least one stimulus signal, a comparator for comparing the received stimulus signal to a predetermined stimulus signal, at least one logic gate for waking up the electronic device from low power sleep mode when the received stimulus signal is the predetermined stimulus signal, and electronic circuitry, responsive to the operation of the logic gate, for further operation of the electronic device. The device may further include a self-power source that supplies an operating current for the electronic device, which source may be a battery, solar cell, or any other type of self-power source known in the art. In one aspect, the present invention may be advantageously employed in an electronic device that is operable by a remote control device.

BRIEF DESCRIPTION OF THE DRAWINGS

Other aspects, advantages and novel features of the invention will become more apparent from the following detailed description of the invention when considered in conjunction with the accompanying drawings wherein.

DETAILED DESCRIPTION

Figure 1:
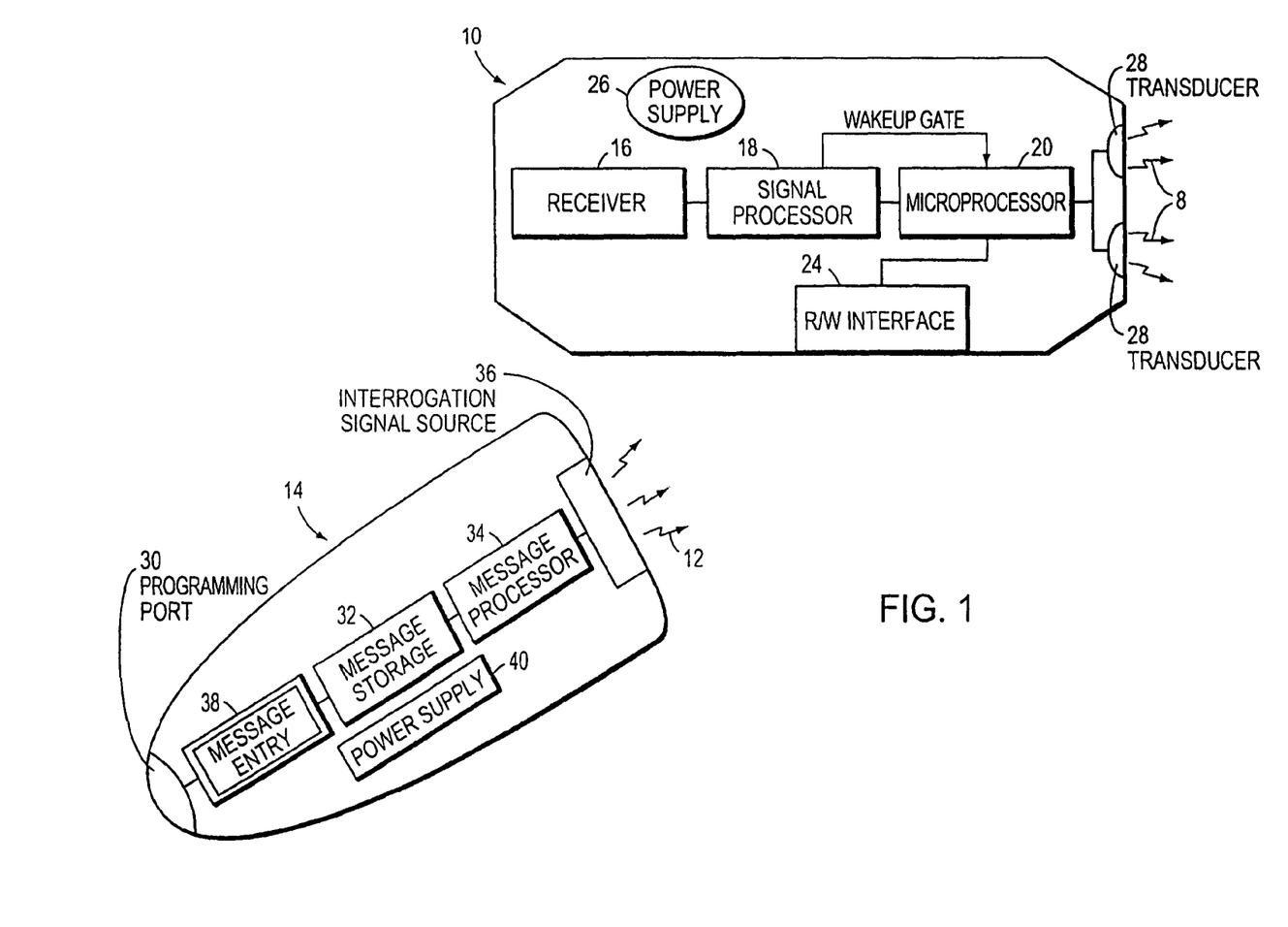
FIG. 1 is a block diagram of an object-locating system in accordance with one application of the invention.

FIG. 1 provides a general overview of an object-locating system whereby a single item can be quickly and precisely located from among a plurality of similar items. A searcher can locate the specific item sought by identifying the source of an observable signal 8 emitted by an identification tag 10. In one embodiment, the identification tag 10 emits the observable signal 8 when it receives a unique interrogation signal 12. As is described herein, the search protocol provided by the system allows an area to be rapidly scanned without the need to individually inspect each item.

Each identification tag 10 is associated with a unique object. In one embodiment, the identification tag 10 is affixed to or otherwise associated with the object. In another embodiment, the tag 10 is affixed to or otherwise associated with an item in close proximity to the object (e.g., a cartridge, a storage container, a physical location, an article of clothing, etc.). The system also includes a transmitter 14 that transmits the interrogation signal 12 in order to locate the object being sought. The interrogation signal 12 may be any signal such as an RF signal, an optical signal (e.g., a light beam), a microwave signal and the like so long as the signal can provide wireless transmission of an object identification. The object identification is information that uniquely identifies one of the tagged items.

In one embodiment, the tag 10 includes a receiver 16, a signal processor 18, a microprocessor 20, a read/write interface 24, a power supply 26, and one or more transducers 28. The receiver 16 may comprise any device such as an antenna, a photodetector, a rectenna and the like provided it is capable of wireless reception of the interrogation signal 12. The received signal is processed by the signal processor 18, which may comprise one or more digital and/or analog electronic components. For example, the signal processor 18 may provide filtering and signal conditioning to facilitate comparison of the object identification contained in the interrogation signal 12 with the tag identification contained in a memory of microprocessor 20. Alternatively, the tag identification may be stored in the media itself. For example, the tag identification may be written onto a protected section of an information storage disk, e.g., a CD.

In one version, the tag identification is stored within the tag 10 at the time it is manufactured. In another version, the tag identification is written to the microprocessor 20 at a later point in time, for example, when the system is configured for a specific application. In one embodiment, the tag 10 includes a read/write interface 24 that facilitates the writing of the tag identification to the tag 10 and subsequent alteration thereof. In another embodiment, the read/write interface 24 allows the tag identification to be read by another device. It should be understood, however, the read/write interface 24 is not required (e.g., where the tag identification is provided at the time of manufacture or system initialization). In either case, the tag 10 may include an external surface where the stored tag identification is also reproduced visibly for easy reference. The ability to read and write the tag identification to or from memory located in the tag 10 is particularly advantageous when the tag 10 is associated with an object of electronic storage media. For example, at the time information is stored in a unique media object, the media's object identification can be automatically associated with the tag 10 via read/write interface 24, thereby identifying the media item where the information is stored. In one version of this embodiment, the read/write interface 24 facilitates physical connection to, e.g., the serial port of a personal computer. Alternatively, the interface 24 may utilize wireless, non-contact communication. For example, the interface 24 may be an optical signal path or an RF signal path.

Regardless of whether a read/write interface 24 is used, each unique object is associated with a unique tag identification. This association creates an object identification that may later be used to identify the object from among a plurality of similar items. Additionally, to facilitate future searches, it is advantageous to record an object-identification/tag-identification association in a manner that allows for its later retrieval. In one embodiment, the association is recorded in a computer database. In a version of this embodiment, the association is automatically recorded when information is stored in an object of electronic storage media.

In one embodiment, the tag 10 is also equipped with a power supply 26 that supplies power to the tag's electronic components. In one embodiment, the power supply 26 is a battery. In a version of this embodiment, the power supply 26 is a lithium coin cell. As described in more detail herein, in one embodiment, the tag 10 operates in a substantially passive mode despite the fact that the tag 10 includes a power supply 26. In particular, the identification tag 10 operates in a low-power shutdown mode until the interrogation signal 12 is detected. In one embodiment, substantially passive operation is achieved, in part, because the tag 10 does not include a linear amplifier. Instead, the tag includes a filter to isolate the carrier frequency of interrogation, and a very low power comparator to detect the frequency and wake up the tag's microprocessor 20. The tag 10 desirably draws less than 500 nanoamps when not processing an interrogation signal 12. Indeed, the tag 10 may draw less than 300 nanoamps or even less than 100 nanoamps.

In one embodiment, the tag 10 is comprised of a single integrated circuit. However, the tag 10 need not be a single unit and it is shown in this manner only for reference. Thus, various of the identified system elements may be moved outside the tag 10 provided that the functional objectives are achieved. For example, the transducers 28 may be located in a storage rack adjacent the tagged item.

In one embodiment, the transmitter 14 of FIG. 1 includes a programming port 30, a message storage device 32, a message processor 34, an interrogation signal source 36, a message entry device 38, and a power supply 40. The message storage device 32 stores one or more object identification messages. Additionally, to ease the retrieval of object identification messages, the message storage device 32 (or an external computer in communication with message storage device 32) may also store one or more item/message associations in a database. These associations allow a user to simply select the item to be located, and the database then selects the corresponding object identification message. In one embodiment, the transmitter 14 includes a separate memory for storing these item/message associations. The message storage device 32, which may be a microcontroller incorporated in a circuit card, supplies the object identification message to the message processor 34, which embeds this in an output signal in a detectable fashion (e.g., by modulating the signal). For example, the object identification message may be embedded in either an AM or a FM signal. With either signal type, the signal includes a carrier frequency with a signal characteristic altered in a manner that encodes the message in the signal. Additionally, regardless of the modulation scheme employed, the message is encoded such that when interrogation signal 12 is demodulated by tag 10, the message includes the object identification. In a version of the AM embodiment, the message processor 34 comprises an amplitude-modulating driver, e.g., a MOSFET switch, which acts on the message received from the message storage device 32.

The interrogation signal source 36 receives the signal from the message processor 34 and transmits it in a format that is compatible with the tag's receiver 16, e.g., an optical signal or a RF signal. To encode the message, message processor 34 causes the interrogation signal source 36 to alter the output intensity or frequency of the interrogation signal 12. For example, in the optical embodiment, the intensity of the resulting interrogation signal 12 is altered in response to the modulated signal. In one version of this embodiment, the message processor 34 provides an amplitude-modulated 2 kHz signal that is converted to an optical signal by the interrogation signal source 36. The interrogation signal source 36 may be a laser diode. In another version, the laser diode is a 5 milliwatt red diode laser similar to laser diodes employed in laser pointers. In still another version of this embodiment, the interrogation signal source 36 is an array of bright LEDs. The interrogation signal source 36 may include a lens, e.g., a defocusing lens. The ability to defocus an optical interrogation signal 12 is advantageous because it improves the system's safety and broadens the search area. Alternatively, the transmitter 14 may include an adjustable lens capable of being adjusted to change the area that is reached by the interrogation signal 12. The range of the transmitter 14 is desirably at least three meters.

Optical interrogation is advantageous, generally, because it provides visual confirmation of the area that is being searched at any moment. Thus, optical interrogation increases the speed and efficiency of the search. Additionally, optical interrogation is compatible with common experience (e.g., scanning a darkened room with a flashlight) so its operation is natural and familiar.

The programming port 30 and the message entry device 38 each provide independent (or alternative) means of entering one or more object identifications into the transmitter 14. In one version, the programming port 30 is a USB port that facilitates the serial transmission of information from a computer or other electronic storage device to the transmitter 14. Alternatively, in another version, the programming port 30 is a receiver for receiving object identification information that is transmitted to the transmitter 14 via a wireless LAN (e.g., IEEE standard 802.11). In this way, a database of objects and identifiers associated therewith may be stored on an external computer. When the user selects an item of interest, the database supplies the corresponding identifier to the message entry device 38 via the programming port 30. The user therefore need not maintain any awareness of object identifiers; he or she simply selects the desired item. (As previously described, the database may alternatively be included in memory located within the tag 10, and the item selection may be entered directly into the tag 10 via the programming port 30.)

Alternatively, the user may identify the desired item directly, using the message entry device 38. This may be, for example, a keypad or a writing pad integral to a personal digital assistant in which the transmitter 12 is implemented. In still another version, the message entry device 38 includes one or more switches.

The system also achieves an energy efficient interrogation scheme because the transmitter 14 can be configured to consume a minimal amount of power. For example, in one embodiment involving optical signals, the total power drawn by the transmitter 14 is less than or equal to 60 milliamps. As a result, the transmitter 14 can be integrated into wireless handheld devices. In one version of this embodiment, noted above, the wireless handheld device is a personal digital assistant. In another version, the wireless handheld device is a cellular phone.

The signal processor 18 of the tag 10 includes a circuit (such as a passive filter) that isolates particular characteristics of the interrogation signal (such as its carrier frequency), as detected at the receiver 16, from background signals. The signal processor is designed to operate at very low power. When the interrogation signal is detected, a logic gate is asserted, which wakes up the microprocessor 20. The receiver 16 and signal processor 18 of the tag 10 cooperate to condition the object identification code in the received signal (e.g., by demodulation or discrimination). The microprocessor 20 then compares the stored tag identification with the object identification received with the interrogation signal 12. Upon detection of a match, the microprocessor 20 causes the transducer 28 to emit the observable signal 8. The observable signal 8 may be either audible, visible, or both. In one version, the transducer 28 comprises one or more light emitting diodes ("LEDs"). In a further version, the transducer 28 comprises a piezoelectric buzzer. A plurality of transducers 28 may be used to increase the amount of information conveyed by the tag 10 upon interrogation. For example, one observable signal 8 may be emitted when the tag 10 receives an object identification that matches the tag identification and a different observable signal 8 may be emitted when the tag 10 receives an object identification that does not match the tag identification.

In an alternate embodiment, the tag 10 may be employed to block an otherwise observable signal from view until the object identification matching the identification contained in the tag 10 is received. Upon receipt of the matching identification, the tag 10 allows the signal to be observed. In this case, the observable signal 8 may be emitted from a source external to the tag 10. For example, in one embodiment, the tag 10 may include a window that under ambient conditions is opaque, and therefore blocks a light source located behind the tag 10. However, the window becomes transparent when the object identification associated with the tagged item is received, thereby allowing the observable signal 8 to be seen. In one version of this embodiment, the window is a liquid crystal that can be toggled between an opaque state and a transparent state. This version is advantageous because the power consumption of the tag 10 is reduced as a result of the low power requirements of the liquid crystal.

Figure 2:
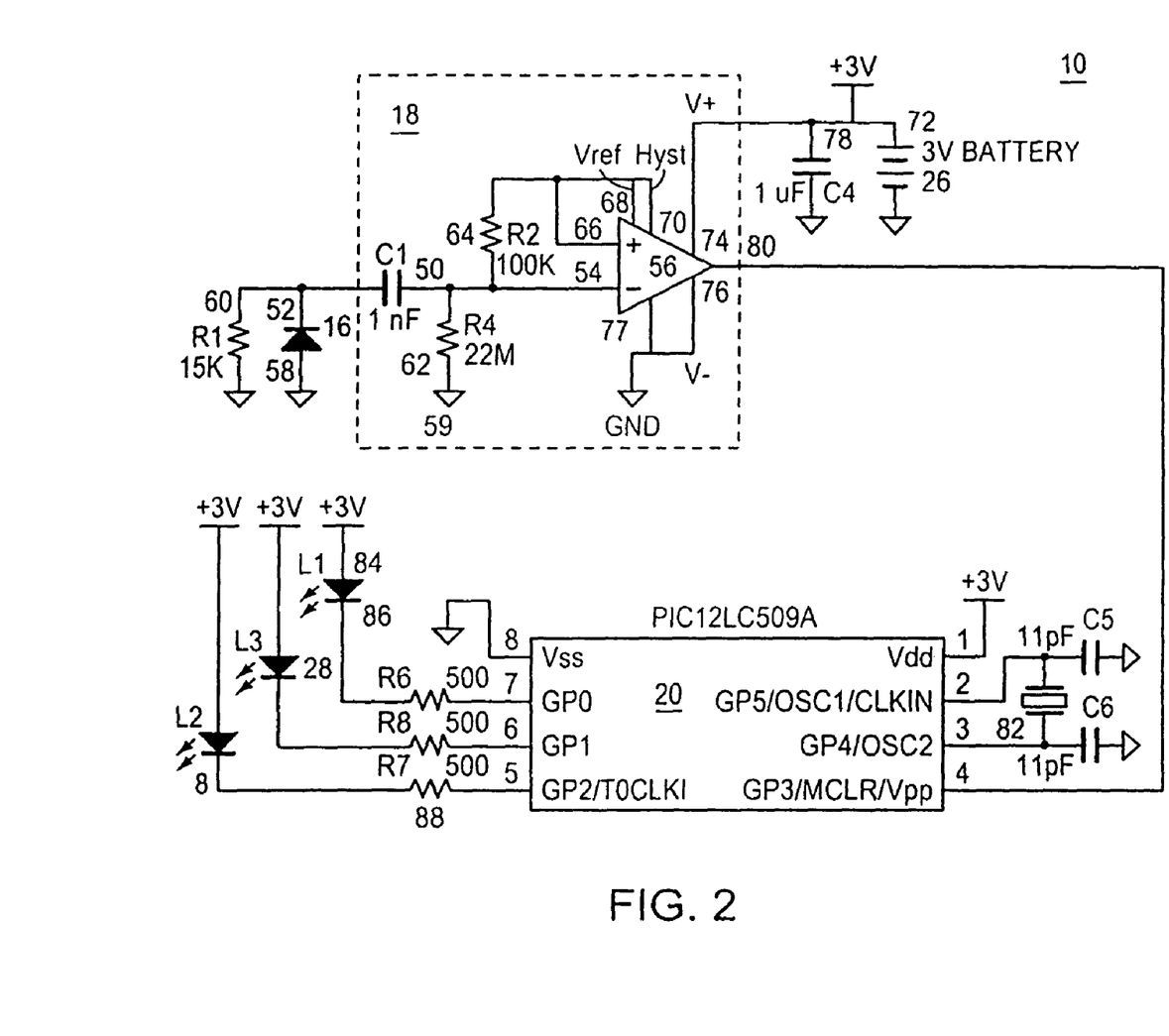
FIG. 2 is a schematic diagram of an identification tag in accordance with one aspect of the invention.

Refer now to FIG. 2, which illustrates a suitable circuit for a tag 10 incorporated in an identification system utilizing pulse-coded optical interrogation signals. This approach is advantageous for at least two reasons. First, because the ambient optical environment is relatively free of optical signals with sharp edges, pulse-coded optical transmission achieves a relatively high signal-to-noise ratio. As a result, a linear amplifier is not required in the tag 10 circuitry, and a very low-power comparator 56 can be used to wake up the microprocessor 20 upon detection of these pulses. Second, an optical message provides a visible beam that indicates to the searcher the area that is being scanned with the interrogation signal 12.

The illustrated circuit comprises a microprocessor 20, transducers 28, a power supply 26, a receiver 16, and signal processing circuitry 18. In the embodiment shown, the receiver 16 is a photodiode and the power supply 26 is a battery, e.g., a lithium coin cell that produces a nominal operating voltage of three volts DC at a nominal capacity of 48 milliamp-hours. The detection and signal processing circuitry 18 includes a high pass filter capacitor 50 connected between the cathode 52 of the receiver 16 and the inverting input 54 of a comparator 56. The anode 58 of the receiver 16 is connected to ground 59, and a load resistor 60 is connected in parallel with the receiver 16. A 15 kΩ resistor 60 results in a large amplitude for the 2 kHz interrogation signal 12 so that the signal 12 is readily sensed by the comparator 56. A second resistor 62 is connected between the inverting input 54 of the comparator 56 and ground 59. Additionally, a third resistor 64 is connected between the inverting input 54 and non-inverting input 66 of the comparator 56. The non-inverting input 66 is also connected to both the comparator's 56 reference voltage input 68 and hysteresis input 70. The positive terminal 72 of the power supply 26 is connected to the positive supply voltage terminal 74 of comparator 56. Both the comparator's negative supply voltage terminal 76 and ground terminal 77 are connected to ground 59. The power supply 26 also provides power to the microprocessor 20 and transducers 28. A second capacitor 78 is connected in parallel with the power supply 26 to remove electrical noise from the output of power supply 26. The comparator output 80 is connected to the microprocessor 20. A crystal 82 is also connected to the microprocessor 20. The crystal 82 provides a clock signal used for timing. In one embodiment, the microprocessor 20 is clocked at 4 MHz and has a 1 MHz instruction cycle. In the embodiment shown, the transducers 28 are LEDs. The anode 84 of each transducer 28 is connected to the positive terminal 72 of the power supply 26, and the cathode 86 of each transducer 28 is connected to the microprocessor 20 through separate transducer resistors 88.

In one version of this embodiment, the values of the high pass filter capacitor 50 and the third resistor 64 are used to set the time constant of the input filter, and the values of the second resistor 62 and the third resistor 64 are used to set the triggering threshold on the received interrogation signal 12. The high pass filter prevents the tag 10 from processing optical signals other than those issuing from the transmitter 14, keeping the microprocessor, which by far dominates the power consumption of the tag electronics, in a very low-power sleep state until the carrier is detected. Thus, the tag 10 will not falsely detect signals generated by either natural light or artificial light, and will not falsely power the processing electronics under these conditions. In one embodiment, the filter time constant is chosen to be much greater than the total period of the interrogation message in order to pass the bits of the interrogation message intact.

In one version of the embodiment shown, the comparator 56 is a nano-power comparator that draws approximately 300 nanoamps when the identification tag 10 is not processing the interrogation signal 12. In this version, the comparator 56 provides a one volt reference which can source or sink up to one milliamp of current. In another version of this embodiment, the tag's power consumption is further reduced by utilizing a microprocessor 20 that operates on approximately 2.5 volts, and draws approximately 200 nanoamps when the microprocessor 20 is in sleep mode. In a further embodiment, the total power consumption of the identification tag 10 is less than or equal to 100 nanoamps when the tag 10 is not processing an interrogation signal 12.

Figure 3:
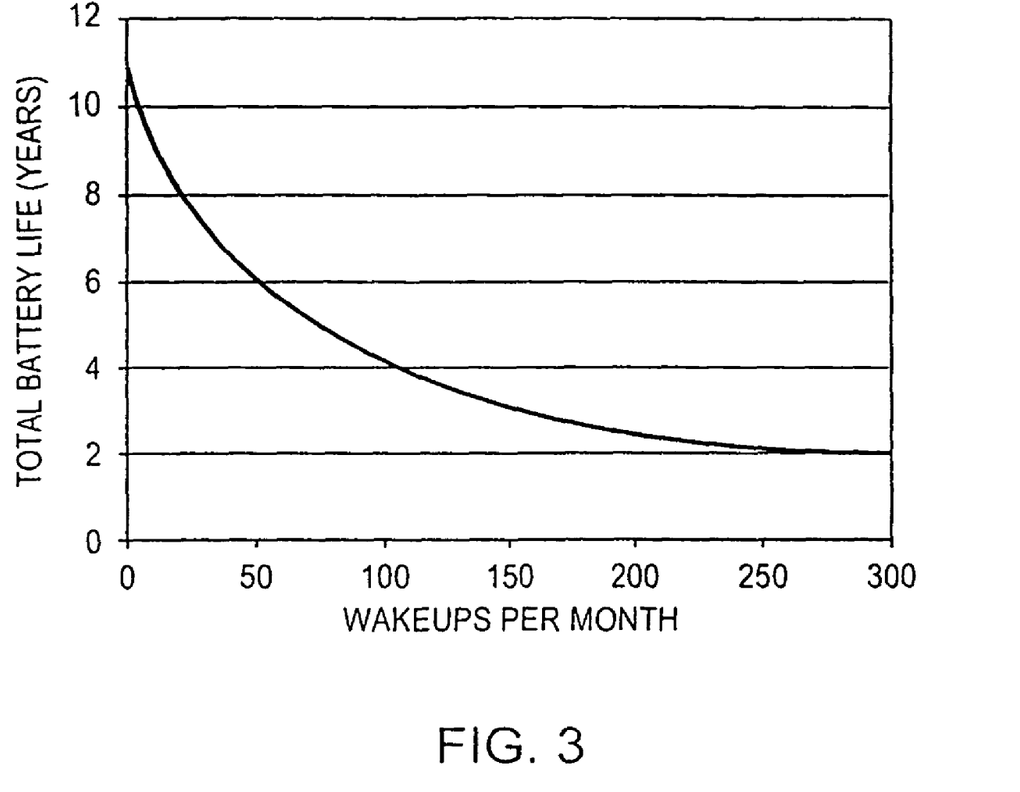
FIG. 3 is a graph of a photodetector signal and a comparator output in accordance with another aspect of the invention.

As a result of these features, substantially passive operation of the identification tag 10 is achieved. FIG. 3 demonstrates the extended battery life that results therefrom. In this version, the battery life is approximately ten years—essentially the battery's shelf life. As can be seen from the graph, this capacity translates into a total battery life of approximately eight years when the identification tag 10 is interrogated twenty-five times a month. Thus, in many applications, the life of the tag 10 is greater than the useful life of the tagged item.

Figure 4:
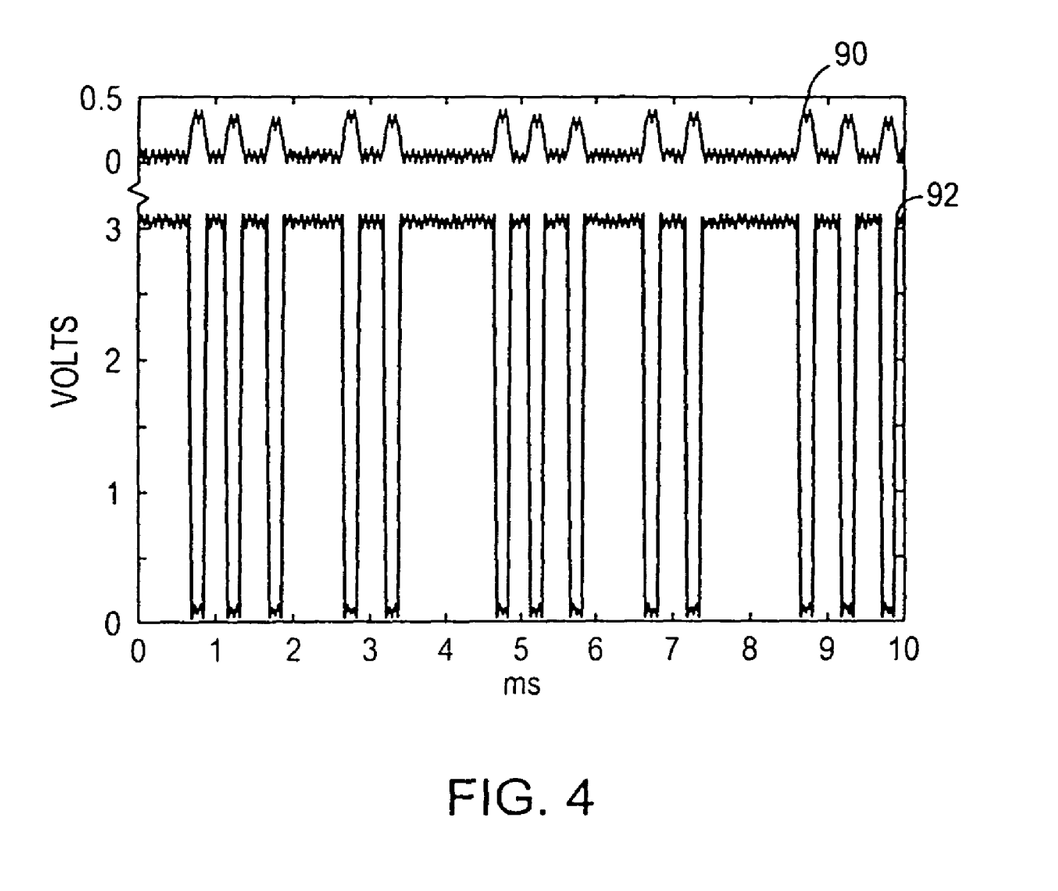
FIG. 4 is a graph of the life of an identification tag power source in accordance with an embodiment of the invention.

Because the photodiode is both insensitive to common dynamic light sources (e.g., fluorescent lights) and unaffected by ambient light levels, the identification tag 10 remains in the sleep mode until the interrogation signal 12 is received. When the comparator 56 receives the filtered output from the receiver 16, the tag 10 awakens and the microprocessor 20 begins to analyze the interrogation signal 12. The comparator output 80 supplies the coded message to the microprocessor 20. The microprocessor 20 hence wakes up when a carrier frequency is detected and begins to decode the message to determine the object identification contained therein. FIG. 4 depicts an example of a receiver output signal 90 and a comparator output signal 92. In one version of this embodiment, the microprocessor 20 employs a conventional serial decoding scheme to decode the message. The communication protocol may employ an on-off keying on half of the transmitted waveform. In one version of this embodiment, the microprocessor 20 is programmed to decode an eight-bit 2 kHz signal.

The identification tag 10 readily synchronizes to the transmission of a 2 kHz signal. In particular, the decoding program synchronizes with the signal by locating a signal transition from zero to one. Once the microprocessor 20 receives the quantity of bits required for a complete object identification, the microprocessor 20 determines if the decoded object identification matches the stored tag identification. Where the message is received serially, the microprocessor 20 rotates each newly-received bit through its buffer and determines the object identification for each new set of bits. In one version, an asynchronous communication protocol is employed. An eight-bit protocol results in thirty-six independent codes, and of these, thirty-five codes are usable because an all zero code is not detected. Further, in another version of this embodiment, a thirty-two bit protocol is employed to provide approximately 70 million independent codes. This approach may also be scaled-up to employ a sixty-four bit or larger protocol.

The system achieves a rapid response time. In one embodiment the microprocessor 20 will wake from the sleep mode approximately 18 milliseconds after receipt of the interrogation signal 12. Once the microprocessor 20 is fully operational, approximately four milliseconds are required to decode the message, thus bringing the total response time to approximately 22 milliseconds. A rapid response time is also achieved with either thirty-two bit or sixty-four bit protocols because only approximately 0.5 milliseconds of additional processing time is required per bit. These results can be further improved by increasing the data rate of the tag 10. In one embodiment, the microprocessor 20 responds by flashing a green, low-power LED if the transmitted object identification matches the tag identification, and a red LED if the object identification does not match the tag identification.

While a preferred embodiment of the present invention is disclosed, many other implementations will occur to one of ordinary skill in the art and are all within the scope of the invention. Further, while the present invention is described in relation to a particular application, it will be clear to one of ordinary skill in the art that the present invention may be advantageously employed for any number of applications in the electronic arts including, but not limited to any self-powered electronic device including, but not limited to, battery- and solar-powered devices, and any electronic device powered by any means that may be remotely activated including, but not limited to, televisions and other audiovisual devices, audio equipment, and automobile remote starters, alarms, and door locks. Use of the present invention in such devices increases the battery life and/or run-time of self-powered devices and decreases the power consumption of any electronic device that employs a "standby" mode by increasing its energy efficiency.

Each of the various embodiments described above may further be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also considered to be within the scope of the present invention, which is not to be limited except by the claims that follow.

What is claimed is:

1. A method of conserving power in an electronic device, comprising the steps of:
   maintaining the electronic device in a continuous low power shutdown mode until a unique stimulus signal is detected; and
   waking up the device from the continuous low power shutdown mode only when the unique stimulus signal is received.

2. The method of claim 1 wherein the unique stimulus signal is an optical signal.

3. The method of claim 2 wherein the optical signal is modulated.

4. The method of claim 1 wherein the unique stimulus signal is a radio frequency signal.

5. A method for waking up an electronic device being maintained in a continuous low power shutdown mode, comprising the steps of:
   receiving a signal at the electronic device;
   comparing the received signal to a predetermined unique stimulus signal; and
   waking up the device from the continuous low power shutdown mode only when the received signal is the same as the predetermined unique stimulus signal.

6. The method of claim 5, the step of comparing further comprising the steps of:
   isolating at least one characteristic of the received signal from background signals; and
   determining whether or not the characteristic of the received signal matches a same characteristic of the predetermined unique stimulus signal.

7. The method of claim 6, wherein the step of isolating comprises filtering the received signal to isolate the carrier frequency of the received signal.

8. The method of claim 5, wherein the step of waking up the device comprises asserting a logic gate.

9. A quasi-passive wakeup device for waking up an electronic device being maintained in a continuous low power sleep mode, comprising:
   a receiver for receiving a stimulus signal; and
   a comparator for comparing a received signal to a predetermined unique stimulus signal and waking up the electronic device from the continuous low power sleep mode only when the received signal is the predetermined unique stimulus signal.

10. The quasi-passive wakeup device of claim 9, wherein the electronic device further comprises a self-power source that supplies an operating current for the electronic device.

11. The quasi-passive wakeup device of claim 10, wherein the self-power source is a battery.

12. The quasi-passive wakeup device of claim 11, wherein the self-power source is a solar cell.

13. The quasi-passive wakeup device of claim 9, further comprising a filter for isolating at least one characteristic of the received signal and wherein the comparator compares the isolated characteristic to a same characteristic of the predetermined unique stimulus signal.

14. The quasi-passive wakeup device of claim 9, wherein the electronic device is operable by a remote control device that is capable of supplying at least the predetermined unique stimulus signal.

15. An electronic device having a quasi-passive wakeup function, comprising:
 a receiver for receiving at least one stimulus signal;
 a comparator for comparing the received stimulus signal to a predetermined unique stimulus signal and for waking up the electronic device from continuous low power sleep mode only when the received stimulus signal is the predetermined unique stimulus signal; and
 electronic circuitry, responsive to the operation of the logic gate, for further operation of the electronic device.

16. The electronic device of claim 15, further comprising a filter for isolating at least one characteristic of the received stimulus signal and wherein the comparator compares the isolated characteristic to a same characteristic of the predetermined unique stimulus signal.

17. The electronic device of claim 15, wherein the electronic device further comprises a self-power source that supplies an operating current for the electronic device.

18. The electronic device of claim 15, wherein the electronic device is operable by a remote control device that is capable of supplying at least the predetermined unique stimulus signal.

* * * * *